Figure 1:
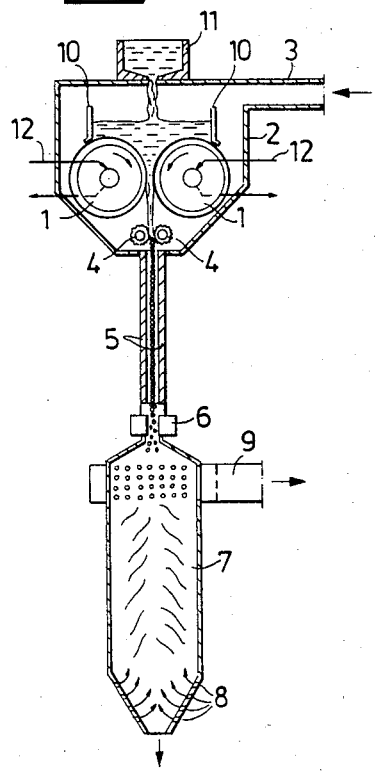

United States Patent [19]

Bergkvist et al.

[11] Patent Number: 4,604,136
[45] Date of Patent: Aug. 5, 1986

[54] METHOD AND AN APPARATUS FOR SUBDIVISION OF AND HEAT RECOVERY FROM A LIQUID SLAG

[75] Inventors: Bruno Bergkvist, Täby; Martti Kölhi, Stenhamra; Erik Strandell, Lidingö; Christer Svemar, Upplands-Väsby, all of Sweden

[73] Assignee: AB Svensk Alunskifferutveckling, Stockholm, Sweden

[21] Appl. No.: 615,879

[22] Filed: May 30, 1984

[51] Int. Cl.⁴ .............................................. F27D 15/02
[52] U.S. Cl. .......................................... 75/24; 122/27; 266/201; 432/83
[58] Field of Search .................... 266/44, 201, 287; 75/24; 122/27; 432/83

[56] References Cited

U.S. PATENT DOCUMENTS

| | | |
|---|---|---|
| 1,113,606 | 10/1914 | Duncan . |
| 4,049,439 | 9/1977 | Nakamura et al. ............... 75/24 |
| 4,268,295 | 5/1981 | Yamamoto et al. ............... 65/19 |
| 4,330,264 | 5/1982 | Konishi et al. .................. 122/27 |
| 4,385,657 | 5/1983 | Hooykaas ....................... 122/27 |
| 4,420,304 | 12/1984 | Nakatani et al. ................ 266/201 |

FOREIGN PATENT DOCUMENTS

| | | |
|---|---|---|
| 109383 | 5/1984 | European Pat. Off. ........... 75/24 |
| 1508039 | 9/1969 | Fed. Rep. of Germany . |
| 3202596 | 10/1982 | Fed. Rep. of Germany . |
| 7802270 | 1/1978 | France . |
| 10836 | of 1889 | United Kingdom . |
| 143500 | 5/1920 | United Kingdom . |

Primary Examiner—Melvyn J. Andrews
Attorney, Agent, or Firm—Christie, Parker & Hale

[57] ABSTRACT

The method in accordance with the invention comprises a rolling of the liquid slag between at least two cooling rolls of metal, preferably steel, the temperature of and the distance between the rolls being controlled such that a cohesive slag slab is obtained having a solidified surface layer and a melted central layer, the slab still being sufficiently plastic to be shapable, a shaping in conjunction with the rolling or after the same, of the slab into briquettes and a recovery of heat at least from the shaped briquettes, preferably after these have been separated from each other, via any suitable cooling means or medium.

The apparatus in accordance with the invention comprises at least two cooling rolls (1) arranged to roll out the liquid slag into a cohesive, shapable slab, means (4) for briquetting the slab and means (5,7) for recovering heat from the shaped briquettes.

9 Claims, 10 Drawing Figures

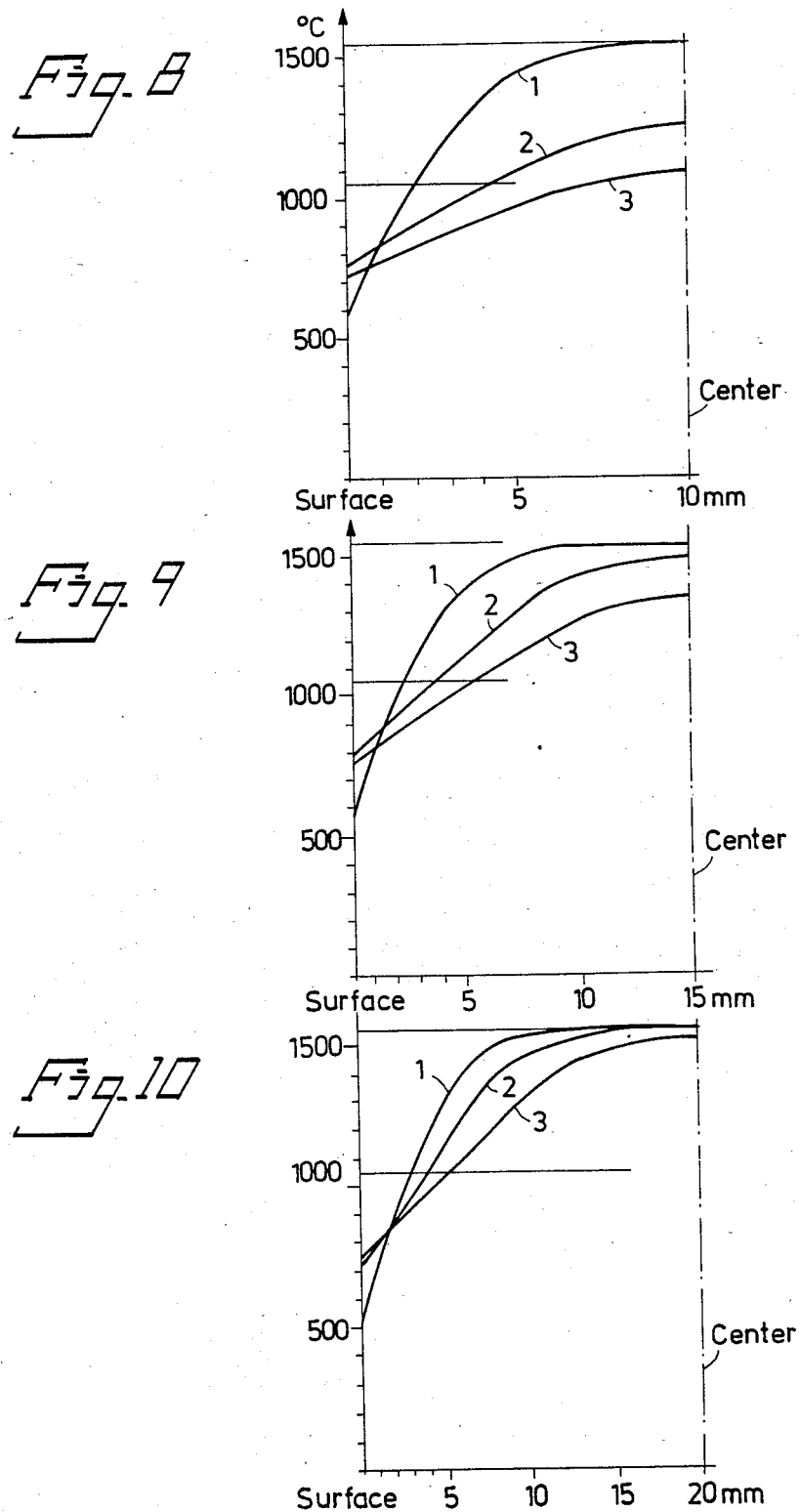

METHOD AND AN APPARATUS FOR SUBDIVISION OF AND HEAT RECOVERY FROM A LIQUID SLAG

TECHNICAL FIELD

The present invention relates to the field of heat recovery from different types of liquid slags, which often have an energy content not to be neglected. More specifically the invention relates to a new method for such heat recovery, which further makes it possible to obtain the processed slag in the form of briquettes, thus opening up possibilities for new fields of uses or enabling a safer deposition of the slag residue than has been possible with the relatively small agglomerates obtained by the prior art so far. The invention also relates to a special apparatus for carrying said method into effect.

BACKGROUND OF THE INVENTION

Against the background of the continually rising energy prices there has been recently more and more interest for heat recovery from liquid slags, actual types of slags for Swedish conditions especially being slags from shale, blast furnace slags and electric arc furnace slags. Thus, in high-temperature vaporization of shale, for instance, there is obtained a liquid slag having a heat content representing about 15% of the total fossil energy content of the shale. Not least for the vaporization process, it is therefore desirable to attempt to make use of the heat content of the slag. In this context one should endeavor to produce steam at such a high pressure that it can be used internally for the operation of compressors for the oxygen plant required, and/or optional compressors for subsequent processes in the further processing of gases up to the end product, e.g. ammonia, methanol, synthetic petrol, synthetic natural gas or synthesising gas for the organic process industry.

However after all, at the internal utilization of the energy content of the slag the recovery of heat from the slag is a subordinate process. This means in turn that the demands for a robust system with high operational reliability are great. Even relatively short shut-downs caused by the heat recovery equipment threatens the economical gains associated with the introduction of this process step. In accordance with the present invention it has been found possible to provide such a robust system having a simple structure and a high operational reliability.

However, apart from recovering as much as possible of the heat content from the slag there have previously also been endeavours to provide a usable product, an example of the prior art being balls of the LECA ® type for insulation purposes, or the recovery of part of the metal content from slags from metallurgical processes by crushing and for instance magnetic separation. For the reasons given above the methods to be found in the literature are based on the condition of accomplishing suitable granulates adapted for special uses.

A Swedish method, the Merotec method, can be mentioned as an example of the prior art in this field, which method is based on the pulverization of a material in a melted, liquid state by means of solid particles, the kinetic energy of which breaks up and finely divides the melted material, whereupon the heat is regained from granulates in a fluidized bed. The method is described in Swedish Patent specification No. 7401822-7 and Swedish Patent Application No. 7809264-0.

A similar method has been developed by Sumitomo Metal Industries Ltd., in Japan, and according to this method the granulation takes place on a rapidly rotating drum, the heat being regained in a fluidized bed combined with a so-called moving bed. The method is disclosed in "Business Japan", March 1982, page 25.

A method utilized in a commercial plant has been developed by Nippon Kokan K. K., the granulation taking place with the aid of compressed air and the slag particles being blown into a chamber, where the heat is transferred to steam via cooling panels. About 40% of the slag heat content is recovered in the steam. This method is described in Mitsubishi Heavy Industries "Technical Revue", June 1981.

Nippon Steel are developing a process based on the same granulation principle with compressed air, but where the major part of the heat is regained in a fluidized bed. A pilot plant for 18 tonnes of slag per hour is to be built, and was expected to be ready by 1983.

It can finally be mentioned that a method has been developed by Kawasaki Steel Corporation, according to which the heat is recovered in a first step by means of radiant heat and in a second step in a cooling shaft while using recirculated air coupled to an exhaust gas boiler. How the agglomeration takes place is not known to us.

Considerable recirculation of slag takes place in the Merotec method, which means an apparatus with large dimensions and great wear. The method also results in wear problems on the cooling tubes in the fluidized bed, which negatively affects the operational costs and availability. Furthermore, relatively large agglomerates are obtained about 5 mm, which requires high air speeds, e.g. 25–30 m/s, for the maintenance of fluidization.

All the described methods also make demands on the physical properties of the slag if the agglomeration is to function. With the strongly acidic slag obtained at high temperature vaporization of e.g. Kvarntorp shale it does not work, since filament-like balls are formed instead of agglomerate with a well defined shape. It would indeed be possible to recover the heat from such balls as well, but then there would be large problems with respect to deposition.

A prerequisite of the known methods is also relatively small agglomerates, which also results in a relatively large specific surface. This means an increased risk of the leaching out of heavy metals during deposition. It would therefore be desirable if slag from a heat recovery plant could be obtained in the form of larger and more compact pieces. This has been found possible by the present invention. The fact that the product is obtained in larger and more compact pieces can also open up new fields of uses for residues of slags of these kinds.

DISCLOSURE OF THE INVENTION

The present invention thus relates to a simple and effective method of recovering heat from a liquid slag, where, after the desired heat recovery, the slag is obtained in the form of larger pieces which can be utilized e.g. for filling purposes or be deposited, suitably in worked-out mine spaces, not least due to a comparatively small specific surface and thereby a reduced risk of undesirable metals leaching out.

The method in accordance with the invention more specifically means that the liquid slag is rolled out between at least two cooling rolls of metal, the temperature of and the distance between the rolls being controlled so as to obtain a cohesive slab or sheet of slag with a solidified surface layer and a melted centre or core layer, whereby the slab is still sufficiently plastic to be formable, that in conjunction with the rolling or afterwards the slab is formed into briquettes and that heat is recovered at least from the formed briquettes by any suitable cooling means or medium.

The great advantages in connection with the invention are that with a comparatively simple apparatus there are obtained cooling times which are sufficiently short for being acceptable from the plant operation aspect, even in a process for the recovery of residual heat of the kind mentioned above, and that the slag is obtained in well defined pieces, i.e. briquettes, with very little waste in the form of crushed slag which must be recirculated. This is surprising against the background of the findings from earlier attempts that even when the slag flows out by itself, on, e.g. an endless belt there are unreasonably long cooling times, due to the low thermal conductivity of the slag, while at the same time inherent stresses in the slag layer have caused irregular lumps and large wastes for recirculation by the crushing operation.

The invention is thus based on rolling of the slag melt between at least a pair of rotating metal cooling rolls. The preferred metal is of course steel, since in this case it is a very resistant material, but the invention is of course applicable to the use of other metals, which are sufficiently resistant against the slag referred to, and enable a sufficiently rapid cooling for the surface of the slag layer to solidify sufficiently quickly. With regard to the expression "cooling rolls", this concerns the slag melt to be treated, and since the latter usually has a temperature exceeding 1000° C., cooling of course generally means substantially higher temperatures than room temperature, which is explained more clearly below.

While the slab rolled from the liquid slag is still plastic it is formed into briquettes. This can e.g. be done by arranging directly after the cooling rolls a pair of briquetting rolls which are preferably also cooled. However, according to a particularly preferable embodiment of the method in accordance with the invention, the cooling rolls are shaped as briquetting rolls, so that the rolling-cooling and the forming into briquettes is undertaken by one and the same pair of rolls.

For the rolling process one should maintain as low a peripheral speed as possible for the cooling rolls and keep such high a level of melted slag above said rolls that the time for contact between the melted slag and the rolls will be sufficient for the surface layer to solidify into a layer which does not stick to the metallic surface, while the centre layer of the rolled-out slab still consists of melted slag.

The cooling temperature required for the cooling rolls is determined by one skilled in the art from case to case, depending on the temperature of the slag melt and its solidifying temperature and on how the heat from the cooling rolls is to be utilized. It is important, however, that the surface temperature of the rolls is sufficiently low for the slag not to adhere to the rolls. In this context a surface temperature of the rolls of below 500° C. is often required, particularly with a slag from a high-temperature vaporization of shale, the temperature of which is within the range of 1200°–1600° C. In accordance with a preferable embodiment of the invention the cooling rolls are operated at a temperature of below 300° C., which gives good conditions for the briquetting operation and the subsequent breaking up or separation into individual briquettes. Particularly in conjunction with these temperature levels a thickness of the rolled-out slab of liquid slag of the order of 10–30 mm is utilized.

After the formation of the rolled-out slab into briquettes, further cooling is suitably carried out before crushing or breaking up into individual briquettes takes place. In accordance with a preferable embodiment of the invention, the shaped briquettes are here cooled to such a low temperature that the portions of the shaped slab lying between the actual briquettes are broken up by themselves so that the briquettes are automatically separated from each other. By this, no further equipment is required for the division into separate briquettes. In relation to the specific temperature data given above, this usually means cooling until the temperature for the portions between the briquettes themselves is below 700° C., at which temperature the slag becomes brittle and the briquettes are easily liberated from each other.

Extraction of heat from the briquettes is suitably done after they have been separated from each other, and this extraction can be carried out in a maner known per se. However, recovery of heat is preferably performed by the individual briquettes being allowed to fall freely down in a cooling shaft, in which they meet a stream of gas fed in from below, e.g. an air stream, which is then taken out upwardly in the cooling shaft in the form of a hot gas supplied to a steam boiler or a gas turbine or the like. The gas stream can for instance also consist of a flow of flue gas from one or more burners, by means of which the original slag is kept in a melted state.

As is indicated above, heat is also suitably recovered between the operation of forming briquettes and the operation of separating them from each other. As cooling means one preferably uses cooling panels arranged along the still cohesive slab of shaped briquettes, which panels extract radiation heat and which are suitably connected to the same steam system as the hot air departing from the cooling shaft.

The heat extracted from around the cooling rolls is of course utilized as well, e.g. with the aid of cooling air in the form of return air from the internal system. The rolls per se are preferably cooled via inlets through the shafts of the rolls, the coolant used e.g. being water (can then be utilized as feed water), oil (usually with a temperature of up to about 300° C.) or water at high pressure for steam production (special seals are required).

The invention also relates to a special apparatus for carrying out the method described above. This apparatus is distinguished in that it includes at least two cooling rolls arranged for rolling out the liquid slag to a cohesive, formable slab, means for briquetting of the slab and means for recovery of heat from the briquettes formed.

According to a preferred embodiment of the apparatus in accordance with the invention, the cooling rolls are the briquetting means, i.e. the cooling rolls are shaped as briquetting rolls. In this way the rolling out of the liquid slag and the shaping of the formed slab into briquettes are performed with the aid of one and the same pair of rolls. A substantial advantage with this embodiment is that the contact surface between the rolls and the slag is increased. Thus, if e.g. briquetting rolls are made for ball-shaped briquettes with a size of 30 mm and the distance between the briquettes is 5 mm, the contact surface between metal and slag is increased with 67% compared with a smooth roll with the same length and diameter.

The means for recovery of heat from the shaped briquettes preferably include a cooling shaft in which the briquette are allowed to fall down while meeting a gas stream passed upwardly.

The means for recovery of heat from the shaped briquettes can further include cooling panels arranged for cooling the briquetted but still cohesive slab before breaking up the same into separate briquettes.

According to still another preferable embodiment of the apparatus in accordance with the invention vertical cooling panels are arranged above the cooling rolls for the maintenance of a certain slag level above the rolls, which enables a large contact surface between the slag and the rolls.

DRAWING

Figure 2:
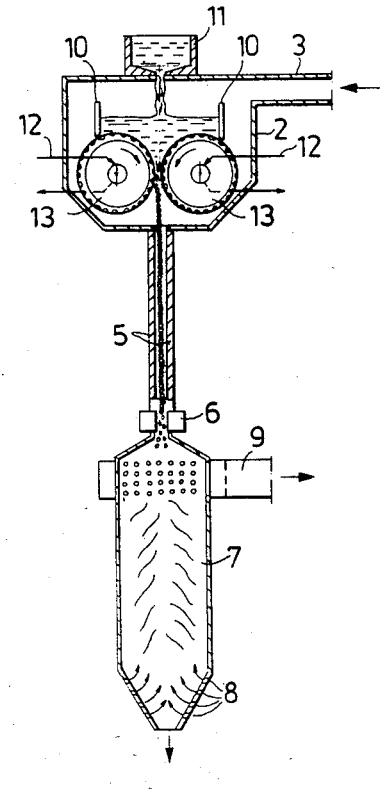
Figure 3:
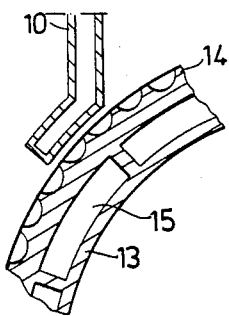
Figure 4:
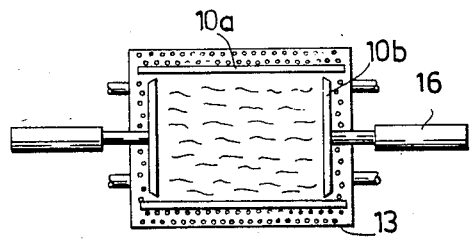
Figure 5:
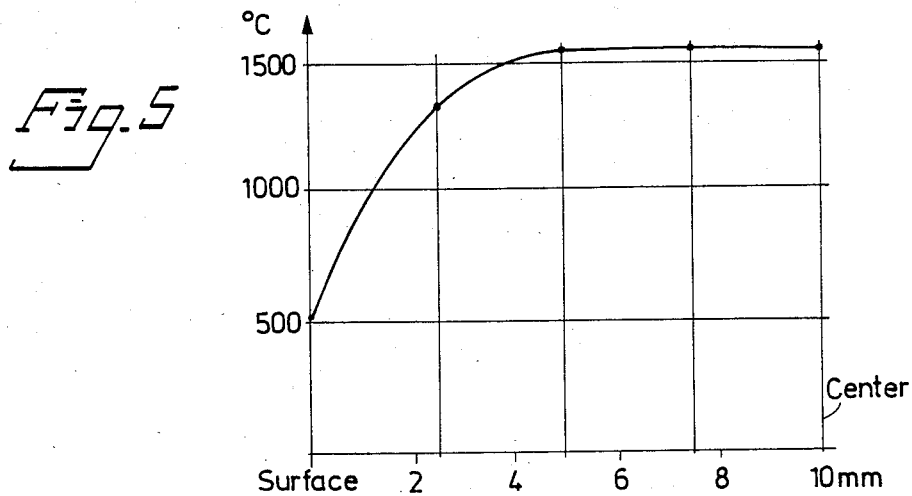

The invention will now be described more in detail with reference to the accompanying drawings, on which FIG. 1 schematically illustrates an embodiment of the apparatus in accordance with the invention where the rolling takes place with smooth rolls and the briquetting is carried out with a subsequent pair of rolls, and FIG. 2 shows another embodiment of the apparatus in accordance with the invention where the rolling and briquetting operations takes place by one and the same pair of rolls. FIG. 3 shows a section through a part of a roll for briquetting and cooling as well as a part of an associated cooling panel. FIG. 4 shows a view from above of an embodiment with adjustable cooling panels arranged above the rolls. FIGS. 5–10 finally show temperature curves for rolled briquettes obtained by the apparatus according to FIG. 1 and FIG. 2.

FIG. 1 illustrates more specifically a set of cooling rolls 1 arranged in a casing 2 provided with an inlet 3 for cooling air. Below the pair of rolls 1 and inside the casing 2 there are a pair of briquetting rolls 4 of a considerably less diameter than that of the cooling rolls 1. After the briquetting rolls 4, which are suitably water or oil cooled, there is a section having vertically situated cooling panels 5, which are terminated, in the illustrated embodiment, with a breaker means 6 for breaking up the briquettes shaped by the rolls 4 into separate pieces.

The apparatus further includes a cooling shaft 7 with openings 8 at its bottom for the inlet of cooling air, aid an outlet 9 in its upper part for discharge of the heated cooling air.

In the illustrated embodiment there are also vertical cooling panels 10 inside the casing 2 and immediately above the cooling rolls 1, these panels enabling the maintenance of a given level of the slag melt above the rolls 1, and a buffer 11 enabling a uniform feed of melted slag to the space above the cooling rolls 1 and between the panels 10.

Via inlets along the shafts thereof the cooling rolls 1 are cooled by a coolant which is led in and passed out, respectively, through a piping 12.

The function of the apparatus shown in FIG. 1 can be described as follows.

The melted slag is fed via the buffer 11 down onto the cooling rolls 1, the slag being confined above the rolls by means of the vertical cooling panels 10 so that as large a contact surface as possible is obtained between the slag and the rolls. The rolls are rotated towards each other and form a nip of somewhere between 10 mm and 30 mm. The rotational speed of the rolls is regulated to suit the required cooling time.

A vertically dependent glass slab is advanced with the aid of the cooling rolls 1, this slab having a solidified surface layer and a melted centre layer, the slab still being sufficiently plastic to be shapable. This shaping is performed by means of the briquetting rolls 4. The slab formed into briquettes is still cohesive and is further cooled with the aid of the vertically situated cooling panels 5. These cool the briquettes substantially by radiation to such an extent that they can withstand continued cooling without the risk of deformation or sintering together due to heat transport from within the centre of the briquettes where the slag is still in a melted form. These portions of the slab which are between the briquettes are simultaneously cooled to a temperature low enough for the slab to crack up due to internal stresses, the briquette then falling freely down into the following cooling shaft 7. The breaker means 6 is utilized if necessary to ensure that the briquettes are properly separated from each other. If necessary, the debris formed on breaking up into briquettes can be screened off conventionally before the briquettes are allowed to fall down in the shaft 7.

Heat is extracted from the briquettes in the cooling shaft 7 via a counter air current, which is thus fed in through the openings 8 at the bottom of the shaft and passed out as hot air through the outlet 9. Suitably, this hot air is then transferred via an exhaust gas boiler to the steam system incorporated in the plant for the total process. The cooling air fed in through the openings 8 may possibly be a recirculated air stream.

As described above it is of course furthermore quite suitable to extract the heat from the cooling pands 5 and from the casing 2, and to utilize this heat for the internal steam system as well. In the illustrated embodiment the heat from the casing 2 is taken out via the air stream fed in through the inlet 3, this air stream passing on either side of the slag slab through the panels 5 and being taken out through the outlet from the cooling shaft 7. The heat from the cooling rolls 1 and/or the briquetting rolls 4 is preferably also recovered.

FIG. 2 illustrates more specifically an apparatus in which the cooling rolls 1 of the apparatus according to FIG. 1 have been replaced by cooled briquetting rolls 13. By this the briquetting rolls 4 in FIG. 1 have been dispensed with. The remaining components of the apparatus are of the same kind and have the same functions as the corresponding components of the apparatus according to FIG. 1, and to avoid unnecessary repetitions they have been given corresponding reference numerals.

As with the apparatus in FIG. 1, the melted slag is passed from the buffer 11 down onto the rolls 13. With the aid of the cooling panels 10 the slag is kept above the rolls in the same way as previously. The lower edge of the cooling panel 10 must cover at least one row of depressions to prevent slag from leaking out. This is illustrated in FIG. 3, showing in cross-section a portion of a cooling panel 10 and a portion of the briquetting roll 13 with surface protuberances 14 and channels 15 for coolant immediately below the surface.

The rolls 13, which are rotated towards each other, form a gap or nip which should be adjustable and which determines the thickness of the portions between the briquettes. The nip should normally be capable of being adjusted to between 5 and 10 mm. It should also be possible to increase the nip further in the event of malfunction in operation.

One possibility is to measure the force or pressure created between the rolls and allow this force to control the distance between the rolls automatically. Since the portions between the briquettes will be those most cooled, they will determine the pressure. When these portions solidify entirely, unacceptedly large pressures may occur. At best they should have solidified but still be so plastic as to permit the slag to remain cohesive until it has been cooled further between the radiation panels 5.

In addition thereto the rotational speed of the rolls is determined by the cooling time required. The cooling time in turn is dependent on the temperature of the slag melt feed. It is therefore suitable to allow the rolling speed to be controlled by the slag temperature. For increasing temperatures the speed is reduced and for falling temperatures the speed is increased to a corresponding degree.

If the produced amount of slag is increased or reduced the cooling must be adjusted thereto. At increased amounts it is not possible to increase the rotational speed of the rolls correspondingly, since then the cooling time will be too short, with the risk of a collapse of the briquettes, when they leave the rolls, or a sintering together thereof into a solid cake in the following cooling shaft.

Adjustment of the apparatus to varying slag production must therefore take place in another way. One possibility is illustrated in FIG. 4, the same reference numerals being used as in the preceding figures for details having corresponding functions, which need to be repeated here. The cooling panels 10 over the rolls 13 may be made as two fixed walls 10a in the longitudinal direction of the rolls while the end walls are made as movable panels 10b. When the feed of slag melt declines it is then possible, by sensing the slag level between the cooling panels, to reduce the distance between the end walls 10b by means of hydraulic cylinders 16, or screws, so that the level is kept constant. Thereby the width of the discharged slag slab is reduced, but conditions will otherwise remain the same. The force controlling the distance between the rollers must be compensated for, however, so that the pressure will remain constant.

By allowing in the manner described above, the pressure per surface area between the rolls to control the nip between said rolls, the ignoring slag temperature to control the rotational speed of the rolls and the slag level between the cooling panels to regulate the width of the slag slab, it has been found possible to control the process in a satisfactory manner.

The function of the apparatus illustrated in FIG. 2 is otherwise the same as of the apparatus according to FIG. 1 and will therefore not be repeated here.

Furthermore, in accordance with an alternative embodiment of the invention, the briquetting rolls can be dimensioned such that the briquettes are allowed to fall down in a cooling shaft for final cooling directly after rolling. It should however be more economic to make smaller rolls and subsequently cool by means of radiation panels before the final cooling takes place in a cooling shaft.

Final cooling can also be accomplished in other ways than in a shaft, e.g. on a belt in a tunnel with counter current gas, or on a horizontally rotating cooling table. Even cooling in a rotating drum is conceivable. In spite of the briquettes being liquid in their central portions, the cooled shell is thus strong enough to withstand the stresses created therein.

The invention will now be further illustrated by the following examples.

EXAMPLE 1

In a plant of the kind illustrated in FIG. 1, liquid slag of a temperature of about 1550° C. is rolled in the following conditions.

A slab with a width of 2000 mm and a thickness of 20 mm is rolled out at the rate of 50 m³ slag per hour with the aid of cooling rolls having a diameter of 3 m. The peripheral speed of the rolls is 0.35 m/s. The rolls, cooled with water at a pressure of 10 bars, have a surface temperature of 250° C., and with a cooling time of 9 seconds there is obtained a temperature profile according to FIG. 5 through the slag layer.

The temperature at the surface of the slag slab is thus 500° C., while the centre thereof retains its initial temperature of about 1550° C. Less than 1 mm of the surface layer solidifies, while the rest remains liquid.

Figure 6:
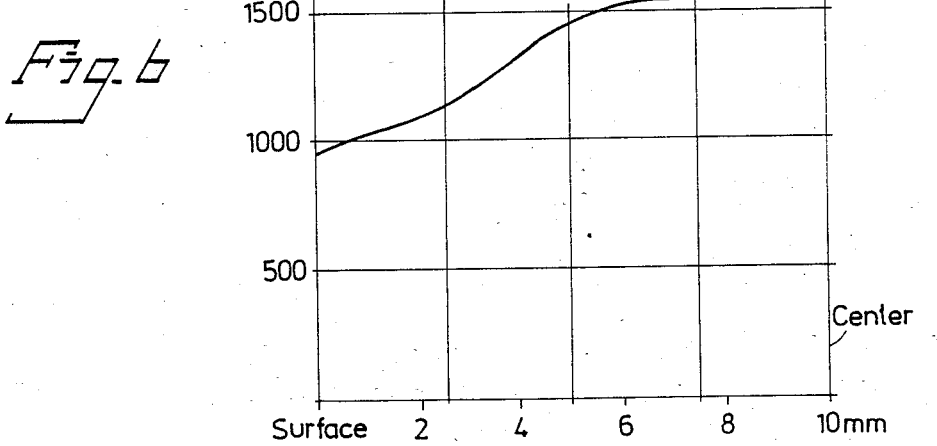
Figure 7:
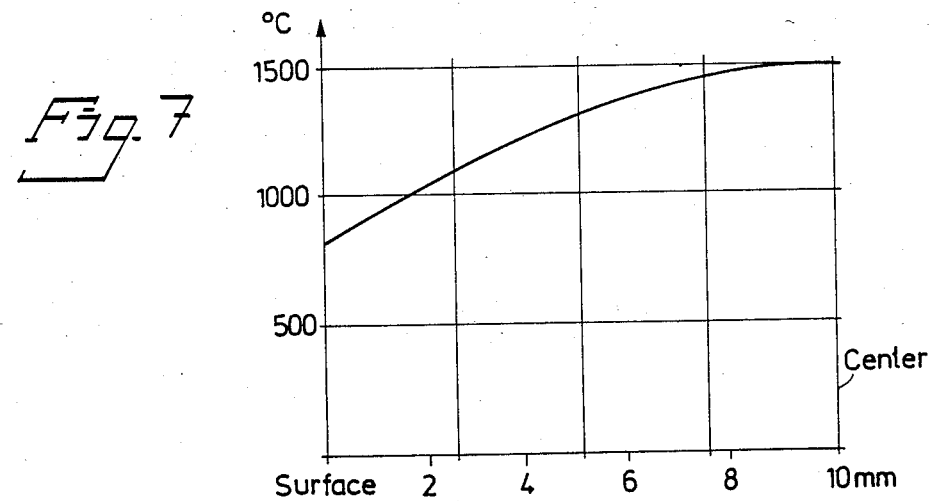

After a cooling distance of about 1.5 m with air cooling the slab formed reaches a pair of water-cooled briquetting rolls with a diameter of 500 mm. The temperature profile of the slab after this air cooling for 1.5 m is illustrated in FIG. 6.

The surface temperature has risen from about 500° C. to about 950° C., while the temperature 1 mm from the surface has fallen by about 100° C.

After briquetting the slab is further cooled between two tube panels by the radiation heat for about 22 seconds. The result is that the strength of the briquettes is increased while the portions between the briquettes are cooled down to the brittle state of the slag which facilitates the separation. The briquettes are substantially of a round shape and have a diameter of about 20 mm, and their temperature profile at the time when the slabs are broken up, after the passage between 7.5 m of tube panels is apparent from FIG. 7. The portion between the briquettes has simultaneously been cooled to an average temperature of about 700° C., at which temperature the slag begins to become brittle and the briquettes are easily liberated from each other.

The free briquettes are collected in a cooling shaft with an area of 3×3 m and an effective height of 7.5 m. Air is fed in at the bottom of the shaft and sucked up in counter current to the briquettes and is exhausted at the top of the shaft. From there the air is fed to an exhaust gas boiler. The air leaves the shaft with a temperature of about 800° C. After the exhaust gas boiler the temperature is about 120° C. The briquettes are discharged from the shaft at an average temperature of about 160° C.

Of the total heat content of the slag, about 14% is recovered during the rolling, about 10% in the radiation panel and about 66% at the final cooling.

EXAMPLE 2

In a plant of the kind illustrated in FIG. 2, liquid slag is rolled under the same conditions as in FIG. 1, with the following exceptions. The width of the slag slab is 4000 mm and the thickness of the portions between the briquettes is 10 mm. The briquettes have diameters of 20, 30 and 40 mm, respectively.

In FIG. 8, the briquettes have a diameter of 20 mm. The figure illustrates the temperature profile in a briquette if the rolls have a diameter of 3.65 m and the contact time of the rolling is 12.4 s. As the sintering temperature of the slag is 1000°–1050° C., this means that the briquettes have an approximately 2 mm thick shell.

The figure also illustrates the temperature profile after further cooling between 6.9 m and 10.9 m long radiation panels, respectively. The shells of the briquettes have grown to about 4 and 7 mm, respectively.

The conditions for round briquettes with a diameter of 40 mm and a roll diameter of 4.2 m are illustrated in FIG. 9. FIG. 10 illustrates the corresponding conditions for briquettes with a diameter of 40 mm and at a roll diameter of 3.6 m.

If the results according to Example 2 are compared with the results from Example 1 it can be established that the rolling with cooled briquetting rollers gives briquettes having considerably stronger shells, since in this case cooling can be taken further during rolling then in the case with smooth cooling rollers.

We claim:

1. A method of sub-dividing and recovering heat from a liquid slag comprising:
    rolling the liquid slag between at least two cooled briquetting rolls, controlling the temperature of and distance between the rolls so as to obtain a cohesive slag slab with shaped briquettes having a solidified surface layer and a melted central layer, cooling the briquetted slab to a temperature whereat the portions of the shaped slab between the briquettes themselves crack up, whereby the briquettes are automatically separated from each other and recovering heat from the separated briquettes.

2. The method of claim 1 wherein heat is recovered from the mutually separated briquettes by allowing them to fall down in a cooling shaft and supplying a gas stream to said cooling shaft.

3. The method of claim 1 including additional recovering of heat transferred to the briquetting rolls.

4. The method of claim 3 including further recovering heat removed from the slab during the cooling step.

5. The method of claim 1 including controlling the temperature of the cooling rolls to below 500° C.

6. The method as claimed in claim 5 including controlling the temperature of the cooling rolls to below 300° C.

7. The method of claim 1 wherein the cooling step includes cooling the briquetted slab until the temperature of the portions between the briquettes falls to a temperature below 700° C.

8. The method of claim 1 wherein the rolling step includes rolling the liquid slag between at least two cooled steel rolls.

9. A method of sub-dividing and recovering heat from a liquid slag comprising:
    rolling the liquid slag between at least two cooled rolls, said rolls contoured to discharge a cohesive slab having a pattern of shaped briquettes interconnected by webs;
    controlling the temperature of said rolls such that the discharged slab has a solidified surface and a melted core;
    cooling the slab to a temperature whereat the web breaks freeing the individual shaped briquettes; and
    recovering heat from the briquettes with a countercurrent of air.

* * * * *